April 25, 1961     A. L. JOHNSON     2,981,368
FILTER TUBE
Filed June 8, 1959
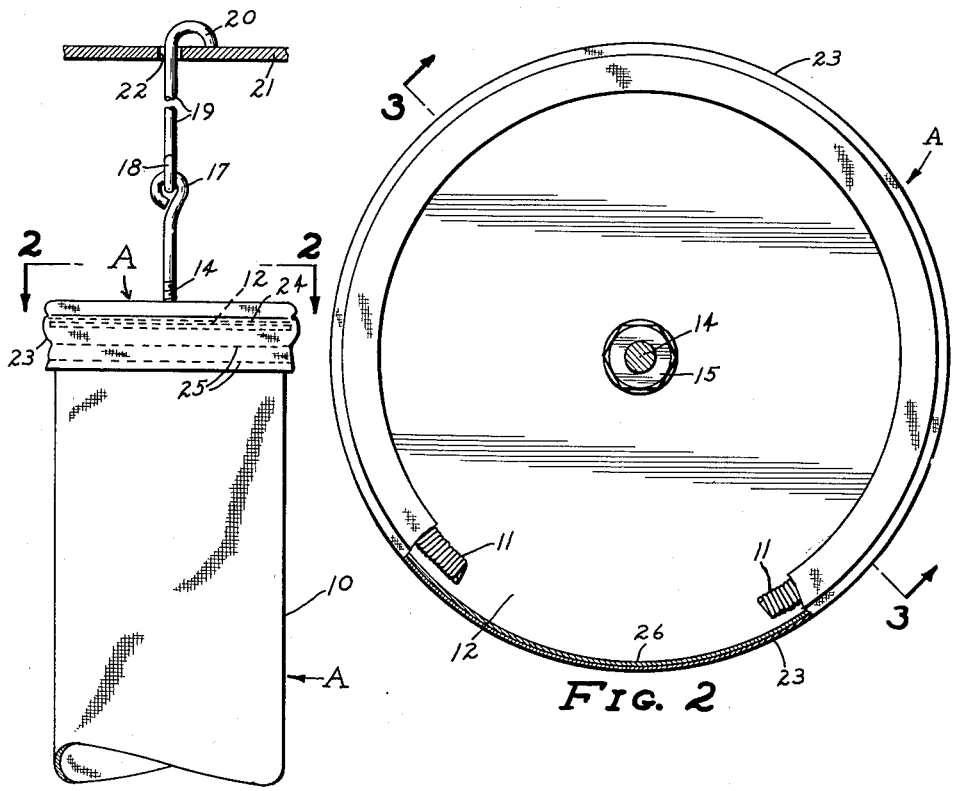
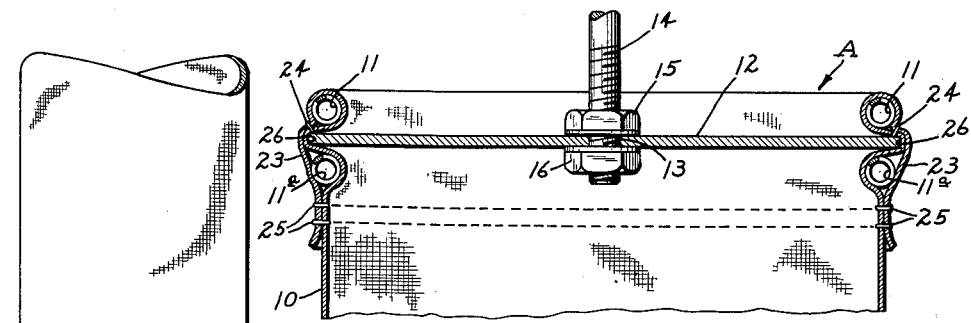
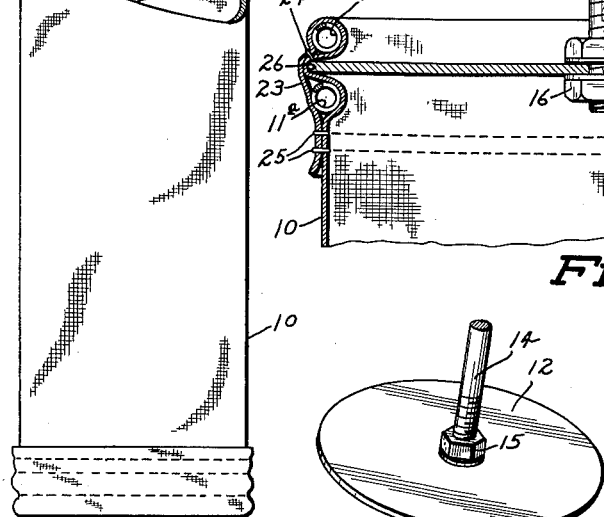
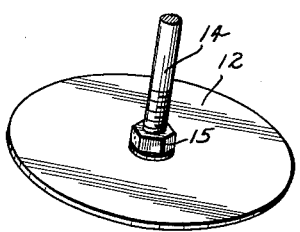
FIG. 1     FIG. 4
INVENTOR.
ANTHONY L. JOHNSON
BY
*Jack N. Wicks*
ATTORNEY

United States Patent Office 2,981,368
Patented Apr. 25, 1961

2,981,368
FILTER TUBE
Anthony L. Johnson, 4611 Lakeview Drive, Edina, Minn.
Filed June 8, 1959, Ser. No. 818,901
2 Claims. (Cl. 183—73)

My invention relates to an improvement in a filter tube and more particularly to means for supporting and closing the upper end of the tube whereby the tube is held in an open elongated position from end to end for use with powder or dust arresting and collecting apparatus.

My filter tube is used in a heated enclosure having air exhaust means and into which liquid skim milk, for example, is sprayed under pressure, and when the skim milk contacts the heated air it turns to a fine powder. Most of the powder thus formed drops to the floor of the enclosure, but that which remains in the air is drawn into the filter tube. The air passes through the porous body of the tube and the powder residue therein does not but drops from the tube onto the floor with that already upon the floor of the enclosure. My filter may be used where any material is dried from a liquid form to a powdered form.

Present day filter tubes are supported by various means but which are inadequate from the standpoints of support of the tube and the formation and closing off of the upper end of the tube.

It is an object of my invention to provide a filter tube having means for supporting the upper end of the tube whereby the tube is also closed off and held in cylindrical open shape from end to end.

It is also an object of my invention to provide means for supporting a filter bag whereby there is a minimal of powder or dust deposit in the upper end of the filter tube.

It is a still further object to provide support means for a filter bag which may be easily connected to the tube or removed therefrom.

I shall not here attempt to set forth and indicate all of the various objects and advantages incident to my invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

Figure 1 is an elevational view of my filter tube in upright support position a portion of which is broken away.

Figure 2 is a top plan view of my support substantially on the line 2—2 of Figure 1, a portion of which is broken away.

Figure 3 is a sectional view on the line 3—3 of Figure 2.

Figure 4 is a perspective view of the top plate member removed from the filter tube.

Referring to the drawings in detail, my filter tube and support A includes the tubular member 10 made up of a porous material such as cotton cloth fabric or the like. Further provided is the upper yieldable ring 11 which may be formed of a coiled spring construction as shown or any relatively firm but yieldable material. Positioned directly below the upper ring 11, in the manner hereinafter described, is the lower yieldable ring 11a which may be formed identical with the ring 11.

The numeral 12 designates a circular plate or baffle member which forms part of the support for the tubular member 10 and also the closure for the top end thereof. The plate 12 has formed centrally thereof the hole 13 which receives the lower threaded end of the rod 14. The rod 14 is secured to the plate 12 by means of the nuts 15 and 16 positioned on the rod 14 on either side of the plate 12 and secured against the plate to thereby mount the rod 14 substantially perpendicular to the plate and externally thereof. The rod 14 has formed on the upper end thereof the eye portion 17 which is engaged with the eye portion 18 of the hanger member 19. The hanger member 19 has formed on the upper free end thereof the hook portion 20 which may be used to engage the support member 21 through the hole 22 formed therein to thereby support the filter tube in a substantially vertical position.

A portion 23 of the upper end of the tubular member 10 is folded back upon itself and the upper ring 11 inserted in the bend of the fold. Then the upper end portion 23 is secured to the member 10 by means of the stitchings 24 thereby permanently securing the upper ring 11 in position. Then the lower ring 11a is placed between the end portion 23 of the tube and the tube proper spaced from the ring 11. The end portion 23 is then sewed to the tube proper by means of the stitchings 25 thereby securing the lower ring 12 substantially in the position shown in Figure 3.

As a result of the spacing of the two rings 11 and 12 the peripheral edge of the plate 12 may be inserted between the rings 11 and 11a by deforming the rings slightly to allow the positioning of the plate between the rings in an annular pocket 26 formed as a result, the rings acting as shoulders between which the pocket is formed. The diameter of the plate 12 is slightly greater than the inside diameter of the rings 11 and 12 thereby allowing the secure positioning of the plate in the annular pocket formed between the rings by means of the material forming the body 10 and the turned-down portion 23 thereof.

With the plate 12 in position as particularly illustrated in Figure 3 the hook 20 may be inserted into the hole 22 of the support 21 thereby supporting the filter tube A in elongated position. The lower end of the tube 10 may be supported in various ways known in the art.

The plate 12 may be easily removed from the tube by deforming slightly the upper and lower rings 11 and 12 respectively whereby the plate may be slipped free of the upper ring 11.

The invention is not to be understood as restricted to the details set forth since these may be modified within the scope of the appended claims without departing from the spirit and scope of the invention.

Having thus described the invention, what I claim as new and desire to secure by Letters Patent is:

1. In a tubular filter bag, a single flexible tubular porous body member, a pair of yieldable rings secured to the upper end of said tubular body in close spaced relation, a circular flat plate member having a diameter greater than the inside diameter of said rings and adapted to be held therebetween, and means for connecting said plate to a support to support the bag from the upper end in an elongated depending open extended position.

2. In a tubular filter bag, a tubular porous body member, a pair of spaced yieldable circular shoulders connected together in close spaced relation and to said body to form an annular recess between said shoulders, and a circular flat plate member having a diameter greater than the inside diameter of said circular shoulders and adapted to be grippingly held in said recess by said shoulders to thereby hold said body member in depending open extended position.

References Cited in the file of this patent
UNITED STATES PATENTS

| | | |
|---|---|---|
| 318,989 | Ingraham | June 2, 1885 |
| 1,336,600 | Tuttle | Apr. 13, 1920 |
| 1,389,482 | Beth | Aug. 30, 1921 |
| 1,692,969 | Van Voorhis | Nov. 27, 1928 |
| 1,713,349 | Owen | May 14, 1929 |
| 2,308,309 | Ruemlin et al. | Jan. 12, 1943 |